US007880420B2

(12) United States Patent
Wu

(10) Patent No.: US 7,880,420 B2
(45) Date of Patent: Feb. 1, 2011

(54) CONTROL SYSTEM AND METHOD OF MASSAGE MACHINE

(76) Inventor: Chichun Wu, Wisefame International Limited, Shaling Industrial Park, Xiakou Administration Zone, Dongcheng District, Dongguan, Guangdong (CN) 523000

( * ) Notice: Subject to any disclaimer, the term of this patent is extended or adjusted under 35 U.S.C. 154(b) by 339 days.

(21) Appl. No.: 11/995,060

(22) PCT Filed: Jul. 8, 2005

(86) PCT No.: PCT/CN2005/001008

§ 371 (c)(1),
(2), (4) Date: Jan. 8, 2008

(87) PCT Pub. No.: WO2007/006173

PCT Pub. Date: Jan. 18, 2007

(65) Prior Publication Data

US 2008/0208087 A1 Aug. 28, 2008

(51) Int. Cl.
*G05B 19/10* (2006.01)

(52) U.S. Cl. ........................ 318/567; 318/799; 318/603

(58) Field of Classification Search ................. 318/799, 318/603, 567, 599, 685; 601/57, 100
See application file for complete search history.

(56) References Cited

U.S. PATENT DOCUMENTS

2006/0211962 A1 * 9/2006 Ferber et al. .................. 601/86

* cited by examiner

*Primary Examiner*—Karen Masih
(74) *Attorney, Agent, or Firm*—Tim Tingkang Xia; Morris, Manning & Martin, LLP

(57) ABSTRACT

A control system and method of massage machine for acting massage therapy on human body includes a common drive motor for driving multiple massage heads, multiple routine keys for setting motor routines and the rotation direction of the drive motor via a multiple sets of motor switches, a timer, and a Single Chip Microcomputer controller for controlling. In operation, a user could not only set operation mode or routine via the routine keys and then activate massage procedure, but also could change the operation mode or routine of the massage machine by reselecting the routine keys at any time.

9 Claims, 6 Drawing Sheets

CONTROL SYSTEM AND METHOD OF MASSAGE MACHINE

FIELD OF THE INVENTION

The present invention relates to human-body massage and SCM (Single Chip Microcomputer) control technology. More particularly, the present invention relates to a control system for driving a massage machine to act massage therapy on human body and a control method of such system.

BACKGROUND OF THE INVENTION

Chinese patent No. 02127013.9 (Publication No. CN1399946A) discloses "a massage machine control method", in which rotary motion applied to a drive motor enables a massage head to vibrate and thus to knock a certain massage area. A drive signal, which repeatedly initiates and stops within a specified time, is conducted to the motor to make it activate intermittently. That is, in order to effectively use the massage head mounted on the massage machine for kneading and stretching dorsal muscles, control mechanism and control circuit is used to achieve knocking motion imitating manual-massage feelings in a simple method. Specifically, the massage machine, the massage head of which vibrates continuously when inputting a continuation of proper voltage, sets the voltage inputted into pulse-shape and repeatedly proceeds such operation within given on-off time, thus making motor operate intermittently, thereby enabling the massage head to perform comfortably knocking motion. More specifically, the first step is to operate switch class of a set portion and to set frequency and duty factor or to set pulse actuation position and phase angle relative to commercial power. Then enter the setting into a calculation portion and subsequently output to a power control portion after calculating. The voltage commuted by a power portion is applied to the knocking motor. As the calculation portion is outputted, transistors and field-effect transistors (FET) of the power control portion make the power on or off, and put pulse voltage into the knocking motor or put voltage of the power portion into the knocking motor. As the calculation portion outputs, three-terminal bidirectional switch and two-end switch component make current flow turned on or cut off. A part of the sine wave of the commercial power which is cut off by the knocking motor is assigned to the pulse-shape voltage. Add pulse signal A of drive method mentioned above to pulse signal B and vary width of the pulse signal B. Accordingly, sine wave or pulse signal B whose frequency is higher than the pulse signal A is generated and output pulse signal which is able to obtain theoretical product of the pulse signal A is produced. Then change duty factor of the sine wave or the pulse signal B to output pulse signal to excite the knocking motor. By a method of PWM (pulse width modulation) mechanism, if duty factor of the pulse signal B is changed, effective value of the voltage relative with the motor will change. In fact, it is able to achieve similar effect of making voltage changed. That is, intensity of knocking could be changed. However, some drawbacks also exist as follows:

1. It is not able to control to operate various selective operation modes such as full routine, upper half-routine, lower half-routine and DEMO (short for demonstration), and it is not able to randomly control to reselect one operation mode during full routine, upper half-routine, lower half-routine or DEMO is performing, thus it is less convenient to use.

2. Using the kneading massage head to knock is realized by increasing simple knocking-motion structure and simple procedure. Because of bringing constant vibrating stimulation, a problem of use feeling significantly worse than manual massage feelings also exists.

Chinese Patent No. 200420117353.1, entitled "a massage machine structure", which is obtained by the present applicant earlier, provides a massage head and a drive device thereof, which could operate various kinds of massage motions.

SUMMARY OF THE INVENTION

Accordingly, an object of the present invention is to provide a control system and a control method of a massage machine which could control to operate various selective operation modes such as full routine, upper half-routine, lower half-routine and DEMO (short for demonstration) and could randomly control to reselect one operation mode during full routine, upper half-routine, lower half-routine or DEMO is performing to overcome drawbacks in the prior art mentioned above.

To achieve the above-mentioned object, the present invention provides a massage control method of an electrical massage machine which includes a Single Chip Microcomputer (SCM) controller, multiple massage heads, a common motor, routine keys, and multiple sets of upper and lower motor switches corresponding to the routine keys. The massage control method comprises steps of:

1.1) setting current upper and lower motor switches according to the current routine key that a user has selected to start a routine, and actuating a timer to count;

1.2) judging whether the value of the timer is within time of the routine or not, if YES, controlling the motor to rotate forward until the state of the current upper motor switch is changed, if NO, going to step 1.4);

1.3) judging whether the value of the timer is within time of the routine or not, if YES, controlling the motor to rotate backward until the state of the current lower motor switch is changed and then returning to step 1.2), if NO, going to the next step;

1.4) ending the routine;

wherein the method further comprises a step between step 1.1) and step 1.4): judging whether the user has reselected one routine key or not, if YES, returning to step 1.1), if NO, continuing the routine.

According to an embodiment of the control method, the routine time is 15 minutes.

According to another embodiment of the control method, the number of the motor switches is four, being respectively a shoulder switch corresponding to shoulder, an upper back switch corresponding to upper back, a lower back switch corresponding to lower back and a waist switch corresponding to waist.

According to still another embodiment of the control method, the routine keys include full routine key, upper half-routine key, and lower half-routine key. The upper motor switch and the lower motor switch corresponding to the full routine key are respectively the shoulder switch and the waist switch. The upper motor switch and the lower motor switch corresponding to the upper half-routine key are respectively the shoulder switch and the lower back switch. The upper motor switch and the lower motor switch corresponding to the lower half-routine key are respectively the upper back switch and the waist switch.

According to an embodiment of the control method, the SCM control program performs steps of:

(1) switching on and initializing a program, that is, setting all port parameters of the Single Chip Microcomputer controller and set registers;

(2) performing watchdog program;

(3) judging a time of 10 millisecond, that is, judging whether a 10 millisecond flag exists or not, if YES, going to the next step, if No, going to step (5);

(4) calling timing and cumulating subprogram to finish carriage direction changing and to realize motor ceasing for 1 second cumulation, LED lamp glittering for 0.5 second cumulation and routine performing for 15 minutes cumulation;

(5) judging a time of 1 millisecond, that is, judging whether a 1 millisecond flag exists or not, if YES, going to the next step, if No, going to step (7);

(6) calling key and LED lamp scanning subprogram to obtain a routine key selected by a user on-line;

(7) judging a time of 250 millisecond, that is, judging whether a 250 millisecond flag exists or not, if YES, going to the next step, if No, going to step (9);

(8) calling routine-switch scanning subprogram to obtain a routine key selected by the user on-line;

(9) judging a time of 3 millisecond, that is, judging whether a 3 millisecond flag exists or not, if YES, going to the next step, if No, going to step (11);

(10) calling motor rolling and kneading control subprogram to control the motor to rotate forward until the state of the current upper motor switch is changed or to control the motor to rotate backward until the state of the current lower motor switch is changed;

(11) judging whether the carriage has been reset: if NO, going to the next step, if YES, going to step (13);

(12) calling carriage resetting subprogram to prepare for the next motor rolling and kneading control;

(13) clearing a T-1S register and adding one to a value of a T-60S register, and judging whether the value of the T-60S register is equivalent to 60, if YES, ending the routine and returning to step (1), if No, going to the step (1) directly.

A control system of a massage machine comprises:

a common drive motor, the common drive motor driving a transmission mechanism to control multiple massage heads of various working ranges to perform imitated massage motion;

a plurality of routine keys;

a plurality sets of upper and lower motor switches, each of the routine keys being used for setting a set of upper and lower motor switches corresponding thereto, the plurality sets of upper and lower motor switches regulating the various working ranges of the motor and thereby defining various routines; and a Single Chip Microcomputer controller, the Single Chip Microcomputer controller controlling the motor to rotate in the working ranges regulated by the motor switches and keeping receiving routine key signal generated when a user selects one routine key to adjust the current upper and the current lower motor switches during the routine is performing.

According to an embodiment of the control system, the number of the motor switches is four, being respectively a shoulder switch corresponding to shoulder, an upper back switch corresponding to upper back, a lower back switch corresponding to lower back and a waist switch corresponding to waist.

According to another embodiment of the control system, the routine keys include full routine key, upper half-routine key, and lower half-routine key. The upper motor switch and the lower motor switch corresponding to the full routine key are respectively the shoulder switch and the waist switch. The upper motor switch and the lower motor switch corresponding to the upper half-routine key are respectively the shoulder switch and the lower back switch. The upper motor switch and the lower motor switch corresponding to the lower half-routine key are respectively the upper back switch and the waist switch.

According to still another embodiment of the control system, the control system comprises a control box and a massage cushion. The Single Chip Microcomputer controller is disposed on a circuit board in the control box. The routine keys are formed on an outer surface of the control box. The motor and the motor switches are disposed in the massage cushion, and the control box is connected with the massage cushion by connection cables.

In comparison with the prior art, the present invention has advantages as follows:

1) The circuit part is simple and low-cost.

2) Only common electronic elements are needed.

3) The program is reasonable and practical.

4) The simulation effect is sound.

5) It is able to operate various routines/operation modes and it is able to change the routine during the routine is performing, thus catering to user's need of changing at any moment.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures.

Figure 1:
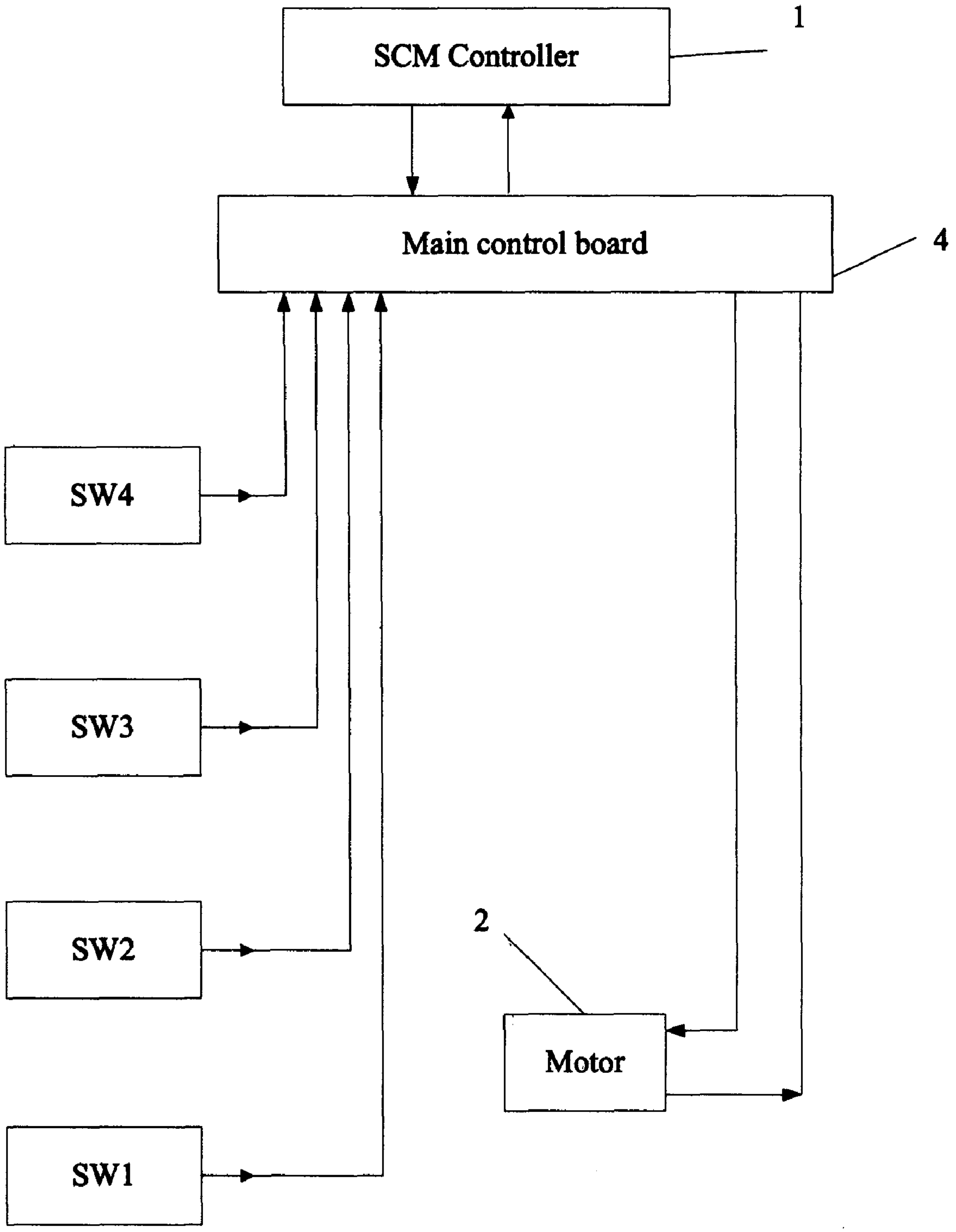
FIG. 1 is an electric schematic diagram of a massage machine control system according to the present invention.

First, hardware structure of a control system of the present invention will be illustrated. Referring to FIG. 1, the hardware structure comprises a SCM controller 1, main control board 4 and multiple routine keys connected to the main control board 4. The SCM controller 1 and the main control board 4 are disposed in a control box. The routine keys are formed on an outer surface of the control box. A massage cushion has four motor switches SW1, SW2, SW3, SW4 and a motor 2 therein. The control box controls and connects to the four motor switches SW1, SW2, SW3, SW4 and a motor 2 in the massage cushion via connection cables, thus enabling to drive the motor 2 therein to rotate and thereby actuating massage heads of the massage machine to operate.

In the subject embodiment, the four motor switches are respectively a shoulder switch SW4 corresponding to shoulder, an upper back switch SW3 corresponding to upper back, a lower back switch SW2 corresponding to lower back and a waist switch SW1 corresponding to waist. The routine keys include full routine (Full) key, upper half-routine (Mid) key and lower half-routine (Down) key. Each routine key corresponds to a set of upper and lower motor switches. That is, the set of upper and lower motor switches regulate a starting position and an ending position of a routine (working range). The motor switch regulating the beginning position is hereinafter referred to as lower motor switch and the motor switch regulating the ending position is hereinafter referred to as upper motor switch. Specifically, the upper motor switch and the lower motor switch corresponding to the full routine key are respectively the shoulder switch SW4 and the waist switch SW1, the upper motor switch and the lower motor switch corresponding to the upper half-routine key are respectively the shoulder switch SW4 and the lower back switch SW2, and the upper motor switch and the lower motor switch corresponding to the lower half-routine key are respectively the upper back switch SW3 and the waist switch SW1.

The SCM controller 1 controls to actuate the motor 2 to rotate in the working ranges regulated by the motor switches, and thereby drives the massage head to move within the routine. When the massage head reaches the ending position of the routine, the state of the upper motor switch will be changed. When the massage head reaches the starting position of the routine, the state of the lower motor switch will be changed. The SCM controller 1 changes carriage direction according to the state change of the motor switch. The SCM controller 1 keeps receiving the routine key signal generated when the user selects or reselects one routine key to adjust the current upper and the current lower motor switches during the routine is performing, and thus controls the working range of the massage head on-line.

Figure 2:
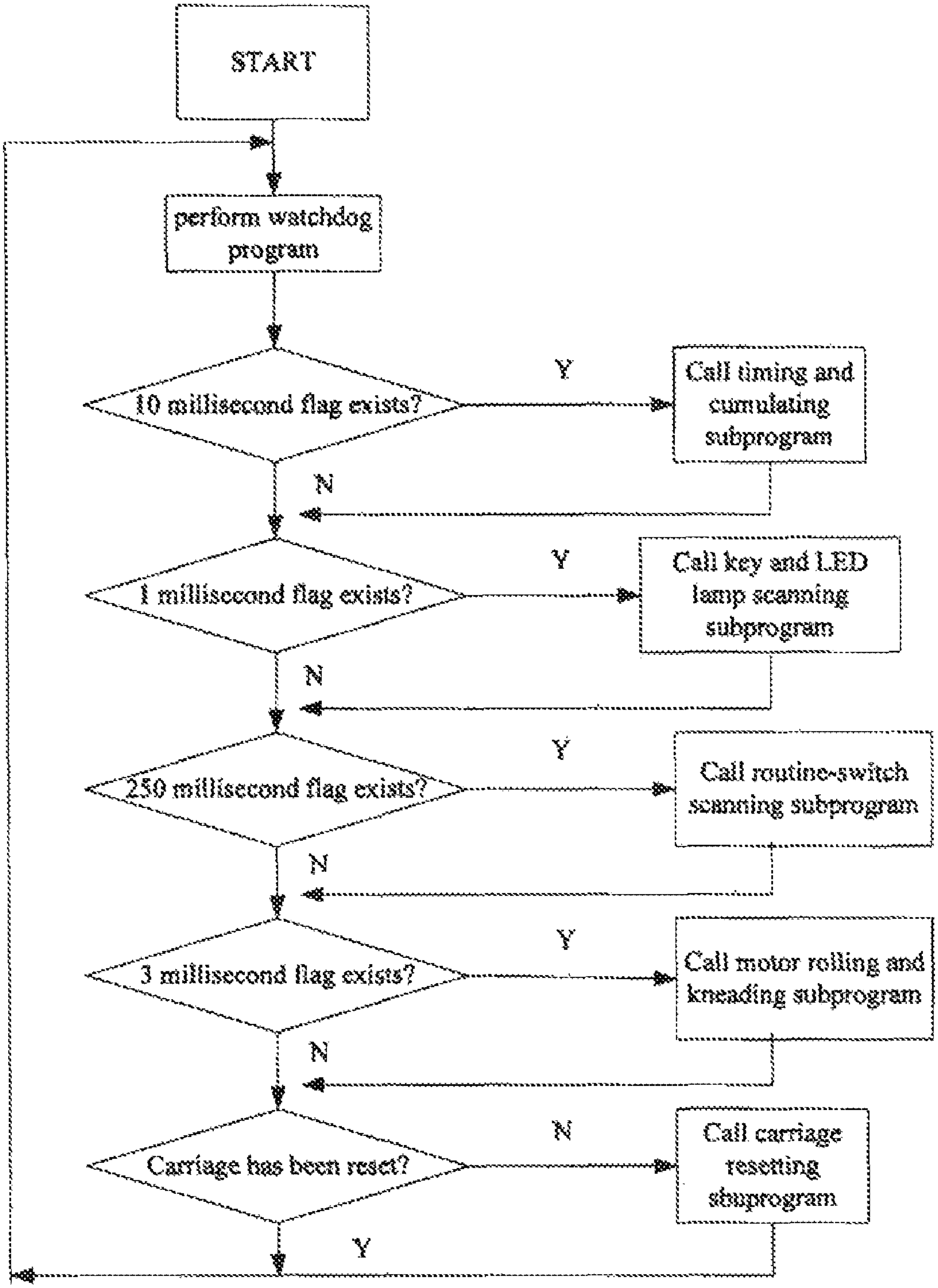
FIG. 2 is a main flow chart of a SCM (Single Chip Microcomputer) program of the control system of FIG. 1.

Further, a SCM control software of the control system of the present invention will be described. FIG. 2 is a flow chart of the main program of the SCM control software. The program comprises:

(1) switching on and initializing a program, that is, setting all port parameters of the Single Chip Microcomputer controller and set registers;

(2) performing watchdog program;

(3) judging a time of 10 millisecond, that is, judging whether a 10 millisecond flag exists or not, if YES, going to the next step, if No, going to step (5);

(4) calling timing and cumulating subprogram to finish carriage direction changing and to realize motor ceasing for 1 second cumulation, LED lamp glittering for 0.5 second cumulation and routine performing for 15 minutes cumulation;

(5) judging a time of 1 millisecond, that is, judging whether a 1 millisecond flag exists or not, if YES, going to the next step, if No, going to step (7);

(6) calling key and LED lamp scanning subprogram to obtain a routine key selected by a user on-line;

(7) judging a time of 250 millisecond, that is, judging whether a 250 millisecond flag exists or not, if YES, going to the next step, if No, going to step (9);

(8) calling routine-switch scanning subprogram to obtain a routine key selected by the user on-line;

(9) judging a time of 3 millisecond, that is, judging whether a 3 millisecond flag exists or not, if YES, going to the next step, if No, going to step (11);

(10) calling motor rolling and kneading control subprogram to control the motor to rotate forward until the state of the current upper motor switch is changed or to control the motor to rotate backward until the state of the current lower motor switch is changed;

(11) judging whether the carriage has been reset: if YES, going to the next step, if No, going to step (13);

(12) calling carriage resetting subprogram to prepare for the next motor rolling and kneading control;

(13) clearing a T-1S register and adding one to a value of a T-60S register, and judging whether the value of the T-60S register is equivalent to 60, if YES, ending the routine and returning to step (1), if No, going to the step (1) directly.

Figure 3:
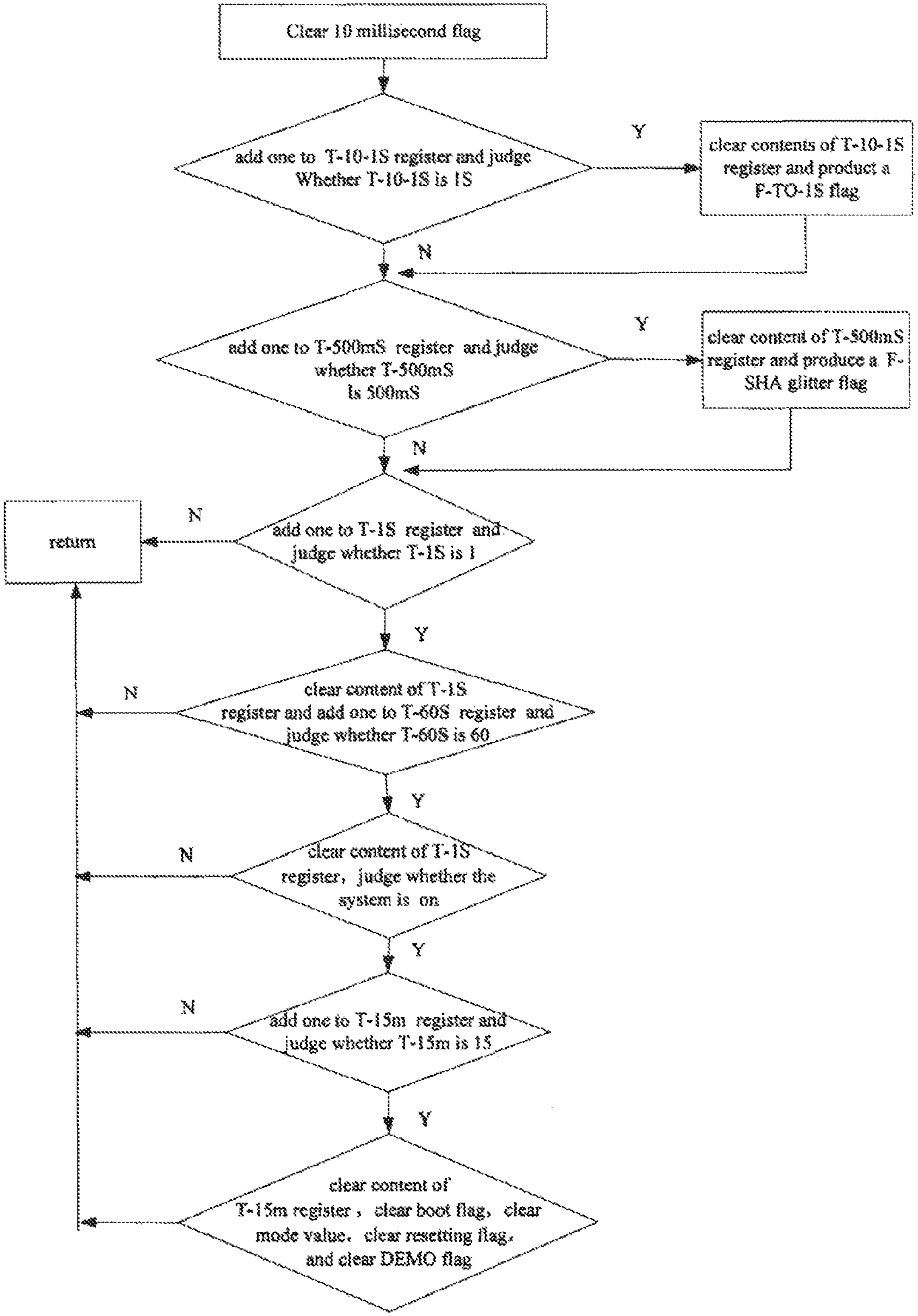
FIG. 3 is a flow chart of a timing and cumulating subprogram of the main flow chart of FIG. 2.

Referring to FIG. 3, a timing and cumulating subprogram is provided to the main program via setting time variable criterion to enable the motor to cease for 1 second, the LED lamp to glitter for 0.5 second cum and the routine to perform for 15 minutes.

Figure 4:
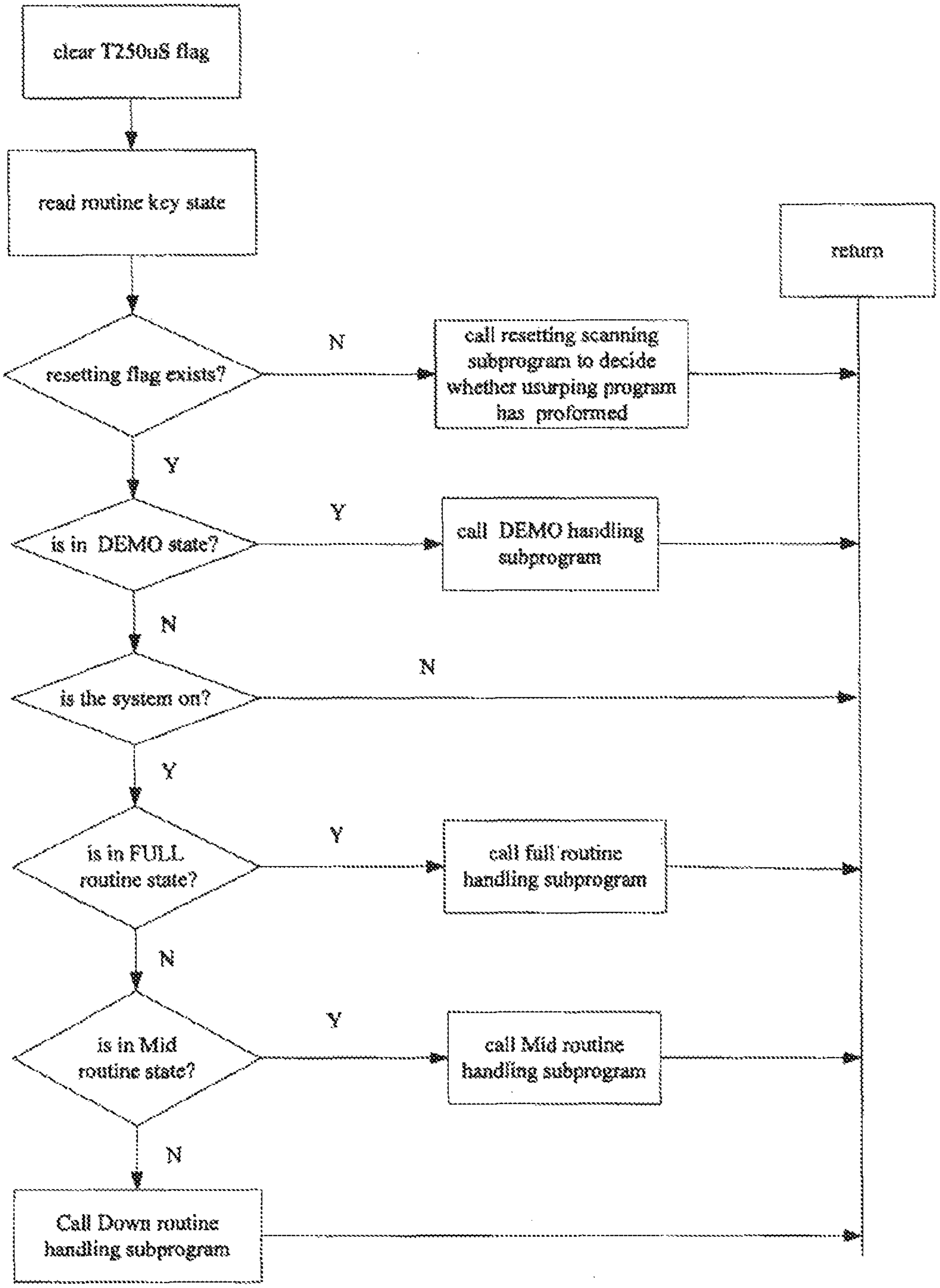
FIG. 4 is a flow chart of a routine switch scanning subprogram of the main flow chart of FIG. 2.

Referring to FIG. 4, a routine switch scanning subprogram calls corresponding handling subprogram once detecting that corresponding routine key is touched.

Figure 5:
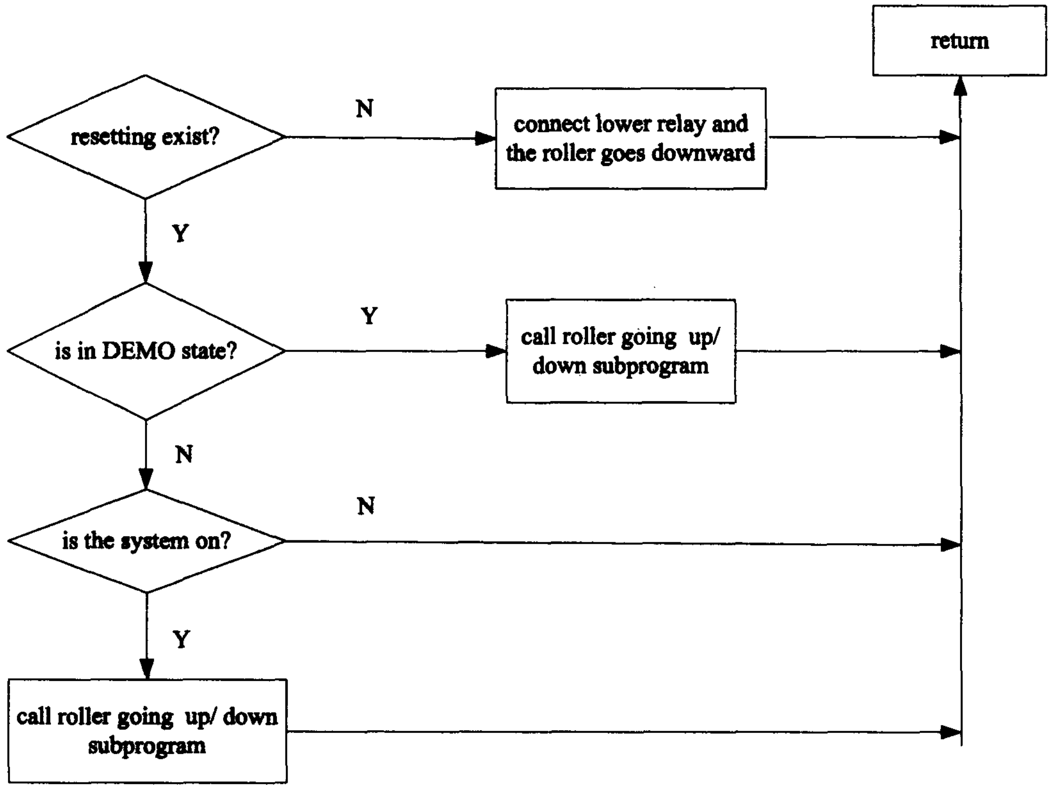
FIG. 5 is a flow chart of a rolling and kneading control subprogram of the main flow chart of FIG. 2.

Referring to FIG. 5, a rolling and kneading control subprogram adds a resetting step during controlling the motor rotating, thereby ensuring the motor works at correct position.

Figure 6:
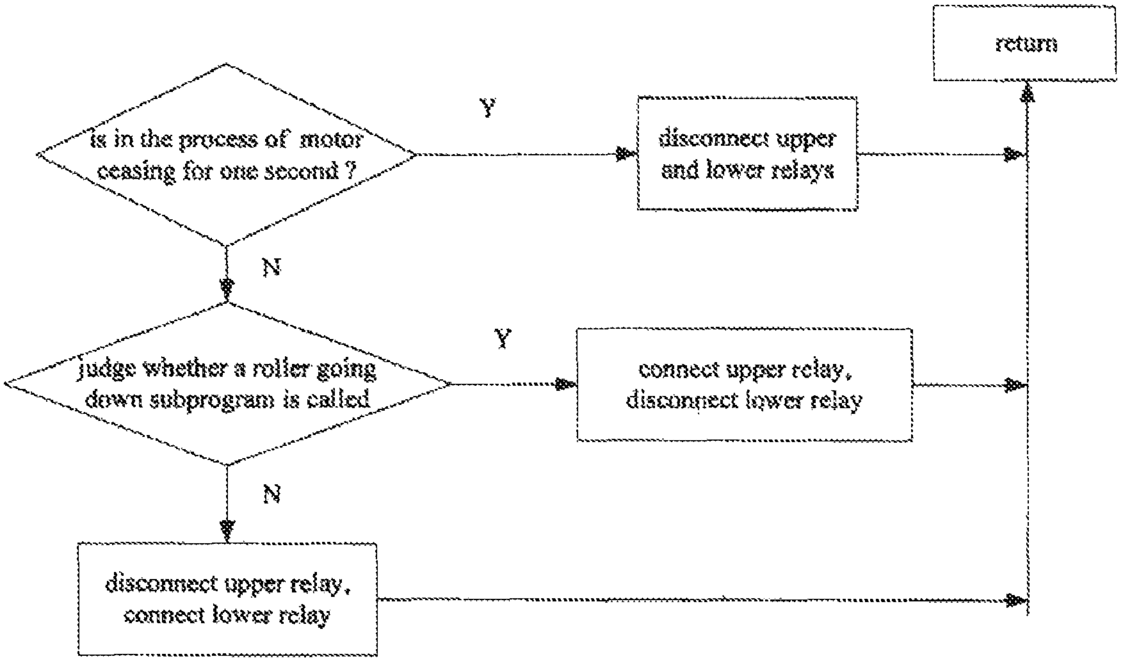
FIG. 6 is a flow chart of roller going up and/or down subprogram of the flow chart of FIG. 5.

Referring to FIG. 6, a roller going up and/or down subprogram controls the motor to rotate forward or backward via upper and lower relays. Specifically, the SCM controller firstly judges whether the motor is in the direction-change process of motor ceasing for 1 second or not, if YES, the upper relay and the lower relay are both made disconnected, if NOT, the SCM controller judges whether a roller going down subprogram is called or not, if NOT, the lower relay is connected and the motor is controlled to rotate forward, and the massage head goes upward until the state of the current upper motor switch is changed, then the lower relay is disconnected; if YES, the upper relay is connected and the motor is controlled to rotate backward, then the massage head goes down until the state of the current lower motor switch is changed, then the upper relay is disconnected.

As the upper and the lower motor switches of the control system of the present invention regulate the movement range of the massage head and simultaneously the SCM controller controls the rotation of the motor, thereby the massage head could be controlled to perform routine massage. Because the upper and the lower motor switches of the control system of the present invention has multiple sets, various massage routines or operation modes such as full routine, upper half-routine and lower half-routine are realized. Besides, as the SCM controller keeps receiving user's routine key signal during motor rotating, and the system is able to randomly adjust the current upper and the current lower motor switches, the user can change a new routine during full routine, upper half-routine, lower half-routine, or DEMO is performing, thus to cater to user's need of changing at any moment.

What is claimed is:

1. A control method of an electrical massage machine which includes a Single Chip Microcomputer controller, multiple massage heads on a carriage driven by a common motor, a plurality of routine keys and a plurality sets of upper and lower motor switches corresponding to the plurality of routine keys, the method comprising steps of:

1.1) setting current upper and lower motor switches according to the current routine key that a user has selected to start a routine, and actuating a timer to count according to a time of the routine;

1.2) judging whether the value of the timer is within the time of the routine or not, if YES, controlling the motor to rotate forward until the state of the current upper motor switch is changed, if NO, going to step 1.4);

1.3) judging whether the value of the timer is within the time of the routine or not, if YES, controlling the motor to rotate backward until the state of the current lower motor switch is changed and then returning to step 1.2), if NO, going to the next step; and 1.4) ending the routine;

wherein the method further comprises a step between step 1.1) and step 1.4): judging whether the user has reselected one routine key or not, if YES, returning to step 1.1); if NO, continuing the routine.

2. The control method according to claim 1, wherein the time of the routine is 15 minutes.

3. The control method according to claim 1, wherein the plurality sets of upper and lower motor switches comprises: a shoulder switch corresponding to a top position, an upper back switch corresponding to upper back, a lower back switch corresponding to lower back, and a waist switch corresponding to a bottom position.

4. The control method according to claim 3, wherein the routine keys comprises: a full routine key, an upper half-routine key, and a lower half-routine key, wherein the set of upper and lower motor switches corresponding to the full routine key comprises the shoulder switch and the waist switch, the set of upper and lower motor switches corresponding to the upper half-routine key comprises the shoulder switch and the lower back switch, and the set of upper and lower motor switches corresponding to the lower half-routine key comprises the upper back switch and the waist switch, respectively.

5. The control method according to claim 1, further comprising steps of:

(1) switching on and initializing a program, that is, setting all port parameters of the Single Chip Microcomputer controller and set registers;

(2) executing a watchdog program;

(3) judging whether a 10 millisecond flag exists or not, if YES, going to the next step, if No, going to step (5);

(4) executing a timing and cumulating subprogram to finish carriage direction changing and to realize motor ceasing for 1 second cumulation, LED lamp glittering for 0.5 second cumulation and routine performing for 15 minutes cumulation;

(5) judging whether a 1 millisecond flag exists or not, if YES, going to the next step, if No, going to step (7);

(6) executing a key and LED lamp scanning subprogram to obtain a routine key selected by a user on-line;

(7) judging whether a 250 millisecond flag exists or not, if YES, going to the next step, if No, going to step (9);

(8) executing a routine-switch scanning subprogram to obtain a routine key selected by the user on-line;

(9) judging whether a 3 millisecond flag exists or not, if YES, going to the next step, if No, going to step (11);

(10) executing a motor rolling and kneading control subprogram to control the motor to rotate forward until the state of the current upper motor switch is changed or to control the motor to rotate backward until the state of the current lower motor switch is changed;

(11) judging whether the carriage has been reset: if YES, going to the next step, if No, going to step (13);

(12) executing a carriage resetting subprogram to prepare for the next motor rolling and kneading control;

(13) clearing a T-1S register and adding one to a value of a T-60S register, and judging whether the value of the T-60S register is equivalent to 60, if YES, ending the routine and returning to step (1), if No, going to the step (1) directly.

6. A control system of a massage machine, comprising:

a common drive motor, the common drive motor driving a transmission mechanism to control multiple massage heads of various working ranges to perform imitated massage motion;

a plurality of routine keys;

a plurality sets of upper and lower motor switches, each of the routine keys being used for setting a set of upper and lower motor switches corresponding thereto, the plurality sets of upper and lower motor switches regulating the various working ranges of the motor and thereby defining various routines; and a Single Chip Microcomputer controller, the Single Chip Microcomputer controller controlling the motor to rotate in the working ranges regulated by the plurality sets of upper and lower motor switches and keeping receiving routine key signal generated when a user selects one routine key to adjust the current upper and the current lower motor switches during the routine is performing.

7. The control system according to claim 6, wherein the plurality of motor switches comprises: a shoulder switch corresponding to a top position, an upper back switch corresponding to upper back, a lower back switch corresponding to lower back, and a waist switch corresponding to a bottom position, respectively.

8. The control system according to claim 7, wherein the plurality of routine keys comprises: a full routine key, an upper half-routine key, and a lower half-routine key, wherein the set of upper and lower motor switches corresponding to the full routine key comprises the shoulder switch and the waist switch, the set of upper and the lower motor switches corresponding to the upper half-routine key comprises the shoulder switch and the lower back switch, and the set of upper and lower motor switches corresponding to the lower half-routine key comprises the upper back switch and the waist switch, respectively.

9. The control system according to claim 6, further comprising a control box and a massage cushion, the Single Chip Microcomputer controller being disposed on a circuit board in the control box, the plurality of routine keys being formed on an outer surface of the control box, the single drive motor and the plurality sets of upper and lower motor switches being disposed in the massage cushion, and the control box being connected with the massage cushion by connection cables.

* * * * *